Figure 7:
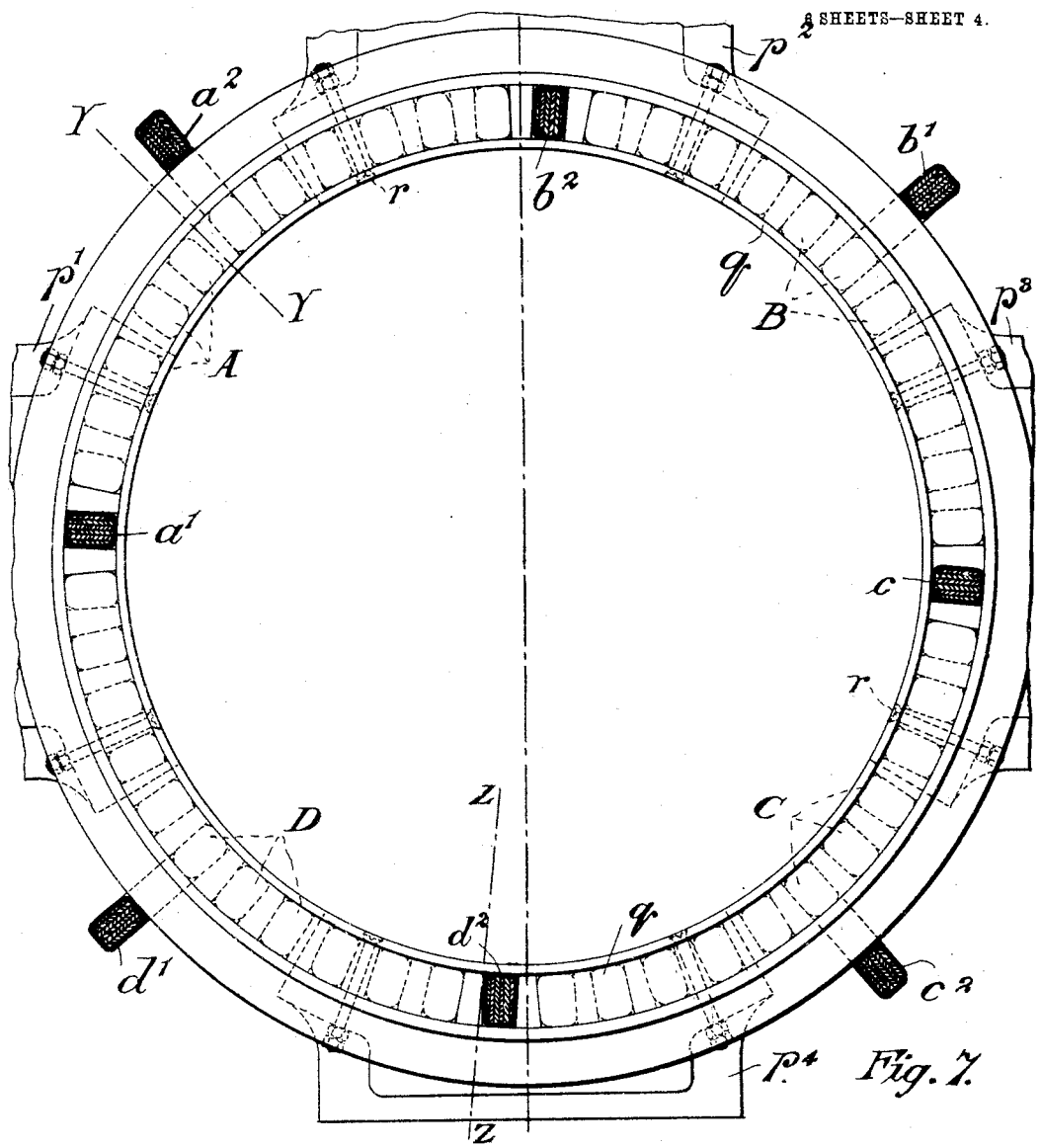

No. 791,492. PATENTED JUNE 6, 1905.
C. A. PARSONS & G. G. STONEY.
DYNAMO ELECTRIC MACHINE.
APPLICATION FILED APR. 18, 1904.
6 SHEETS—SHEET 1.
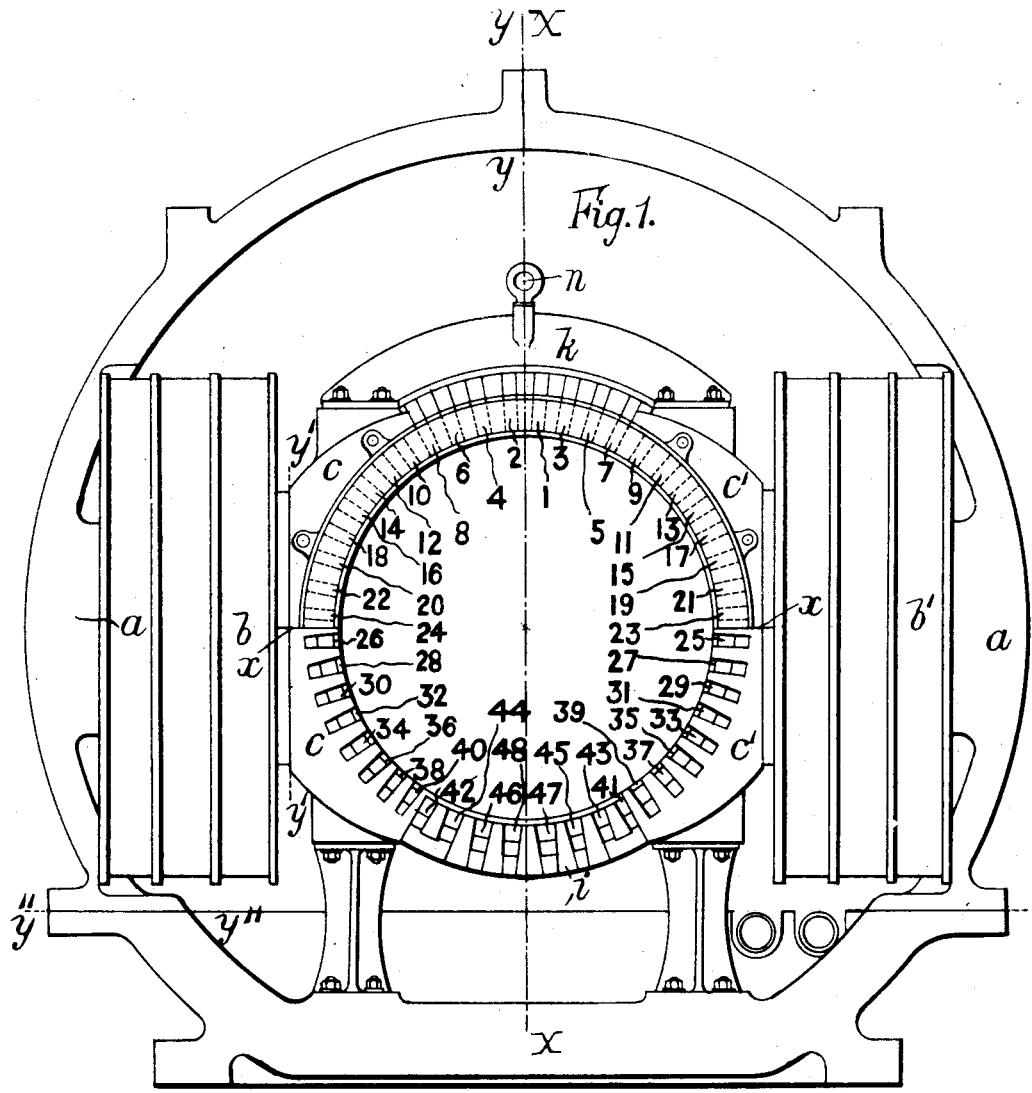

No. 791,492. PATENTED JUNE 6, 1905.
C. A. PARSONS & G. G. STONEY.
DYNAMO ELECTRIC MACHINE.
APPLICATION FILED APR. 18, 1904.
6 SHEETS—SHEET 2.
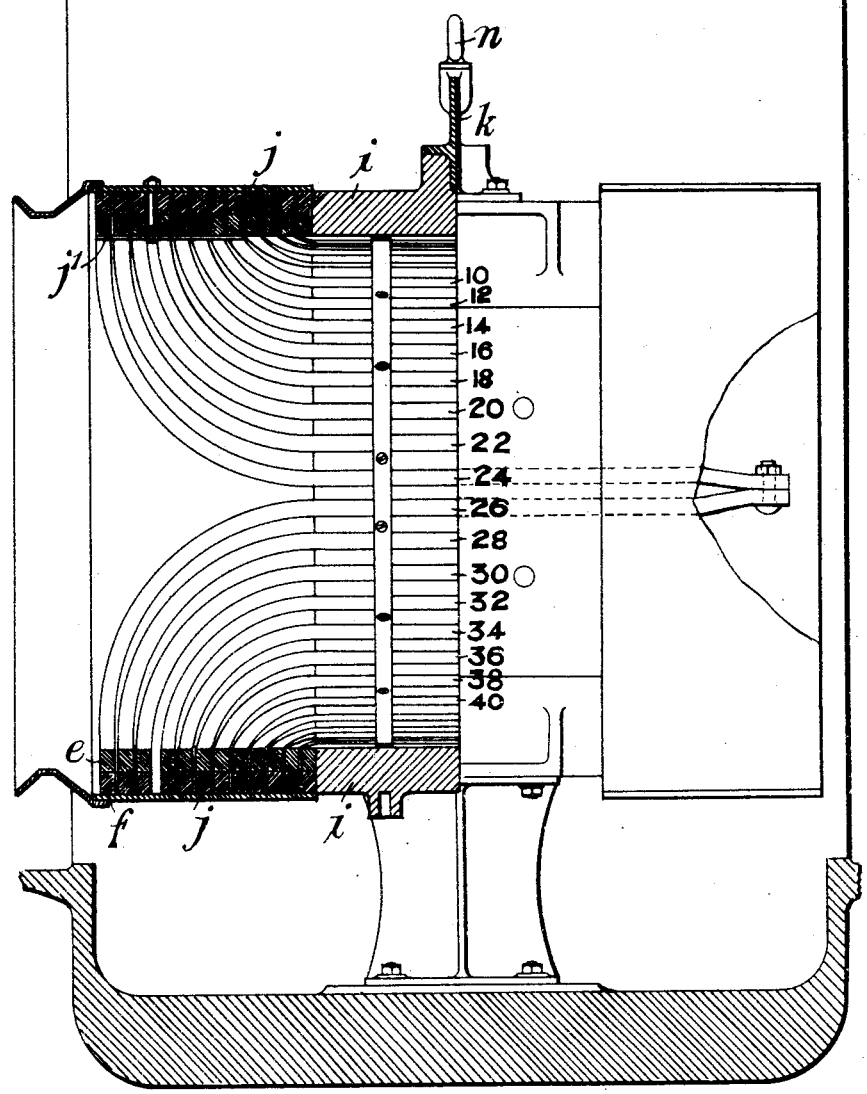

No. 791,492. PATENTED JUNE 6, 1905.
C. A. PARSONS & G. G. STONEY.
DYNAMO ELECTRIC MACHINE.
APPLICATION FILED APR. 18, 1904.
6 SHEETS—SHEET 3.
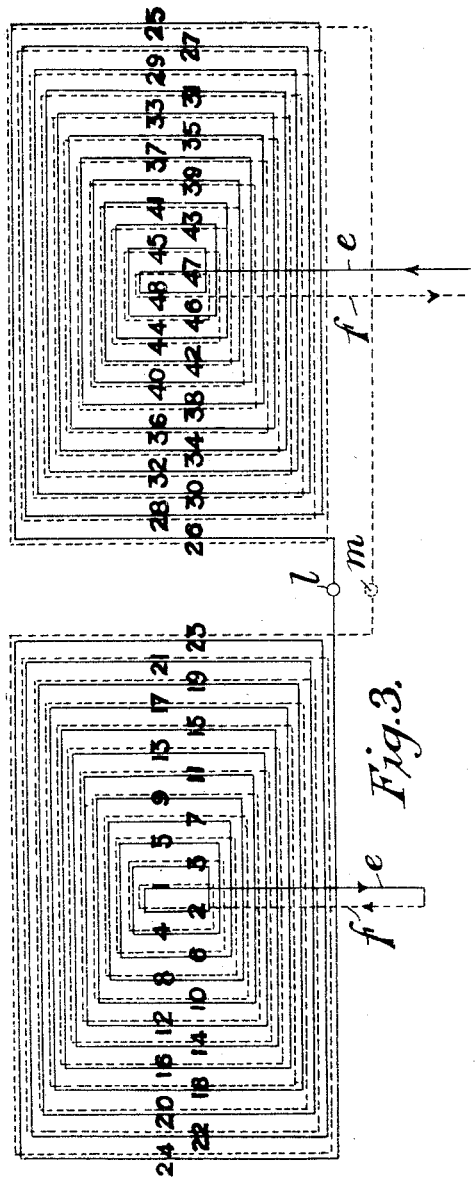
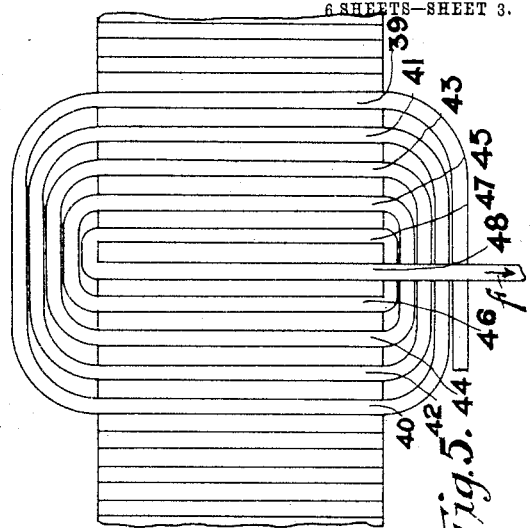
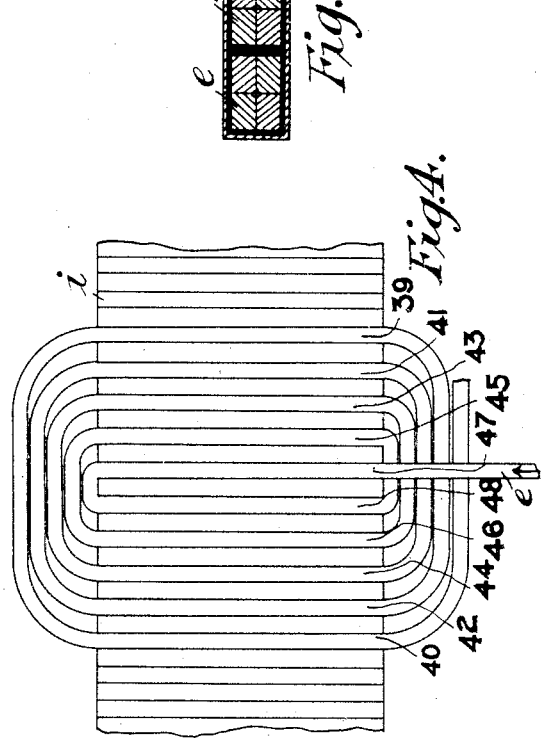

No. 791,492. PATENTED JUNE 6, 1905.
C. A. PARSONS & G. G. STONEY.
DYNAMO ELECTRIC MACHINE.
APPLICATION FILED APR. 18, 1904.
6 SHEETS—SHEET 4.

Attest:
C. J. Malletn
L. B. Middleton

Inventors
Charles A. Parsons,
George G. Stoney.
by Spear, Middleton, Donaldson & Spear
Att'ys No. 791,492. PATENTED JUNE 6, 1905.
C. A. PARSONS & G. G. STONEY.
DYNAMO ELECTRIC MACHINE.
APPLICATION FILED APR. 18, 1904.

6 SHEETS—SHEET 5.

No. 791,492. PATENTED JUNE 6, 1905.
C. A. PARSONS & G. G. STONEY.
DYNAMO ELECTRIC MACHINE.
APPLICATION FILED APR. 18, 1904.
6 SHEETS—SHEET 6.
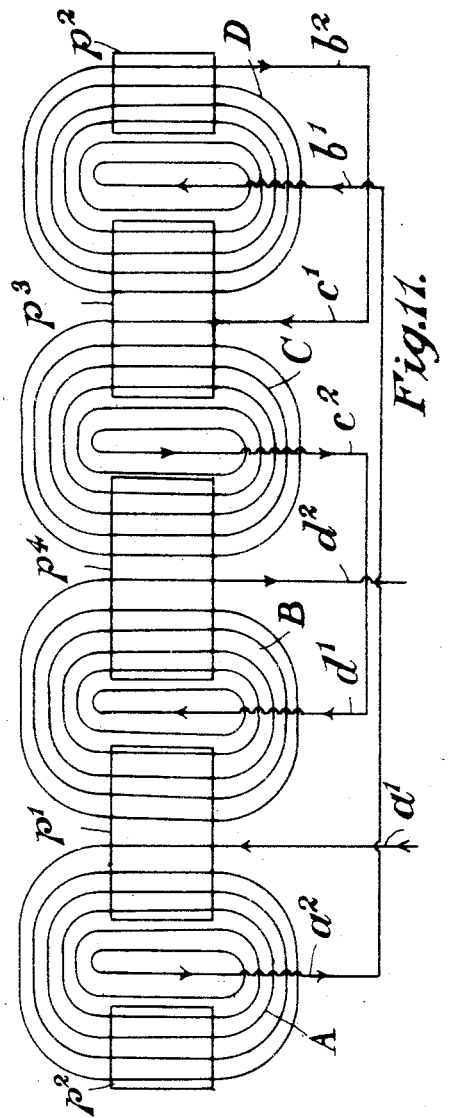
Attest:
C. S. Middleton
L. B. Middleton
Inventors
Charles A. Parsons
George G. Stoney No. 791,492. Patented June 6, 1905.

UNITED STATES PATENT OFFICE.

CHARLES ALGERNON PARSONS AND GEORGE GERALD STONEY, OF NEWCASTLE-UPON-TYNE, ENGLAND; SAID STONEY ASSIGNOR TO SAID PARSONS.

DYNAMO-ELECTRIC MACHINE.

SPECIFICATION forming part of Letters Patent No. 791,492, dated June 6, 1905.

Application filed April 18, 1904. Serial No. 203,970.

*To all whom it may concern:*

Be it known that we, CHARLES ALGERNON PARSONS and GEORGE GERALD STONEY, subjects of the King of Great Britain and Ireland, residing at Heaton Works, Newcastle-upon-Tyne, in the county of Northumberland, England, have invented certain new and useful Improvements Relating to Dynamo-Electric Machines, (for which we have made application for Letters Patent in Great Britain, No. 12,408, dated May 30, 1903,) of which the following is a specification.

Our invention relates to dynamo-electric machines, and particularly to means for neutralizing the distortion of the magnetic field due to the armature-current.

In dynamo-electric machines generally it has been proposed by Prof. George Forbes and others to neutralize the distortion of the magnetic field produced by the armature-current, the means proposed being the placing of current-carrying fixed conductors disposed around the armature; but such devices have never hitherto succeeded in realizing this object, and therefore when tried in practice the resulting machines have always required considerable alteration of the brush positions for running with varying loads, so that no real advance was attained, and the method was therefore abandoned. Now we have found that by a new proportioning and disposition of the fixed coils heretofore proposed we are enabled to successfully apply the principle in practice and that further unexpected and valuable results are at the same time attained.

Our invention therefore consists in obtaining in continuous-current dynamo-electric machines by means of suitably disposed and proportioned fixed windings, first, a practically fixed line of commutation at all loads without sparking; second, an increase in the allowable ampere-turns per inch diameter of the armature, so that an increase of output of at least two or three times may be obtained from a machine of given size.

Our invention further consists in devices and arrangements for providing for the ready removal of the armature when required.

Figure 10:
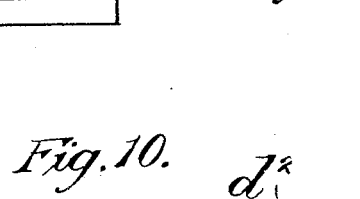
Figure 8:
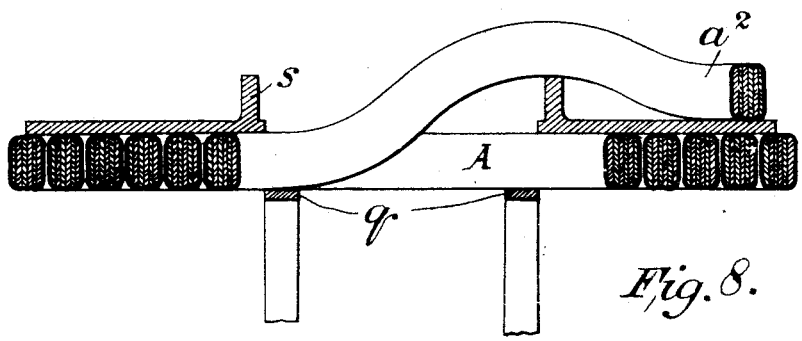
Figure 9:
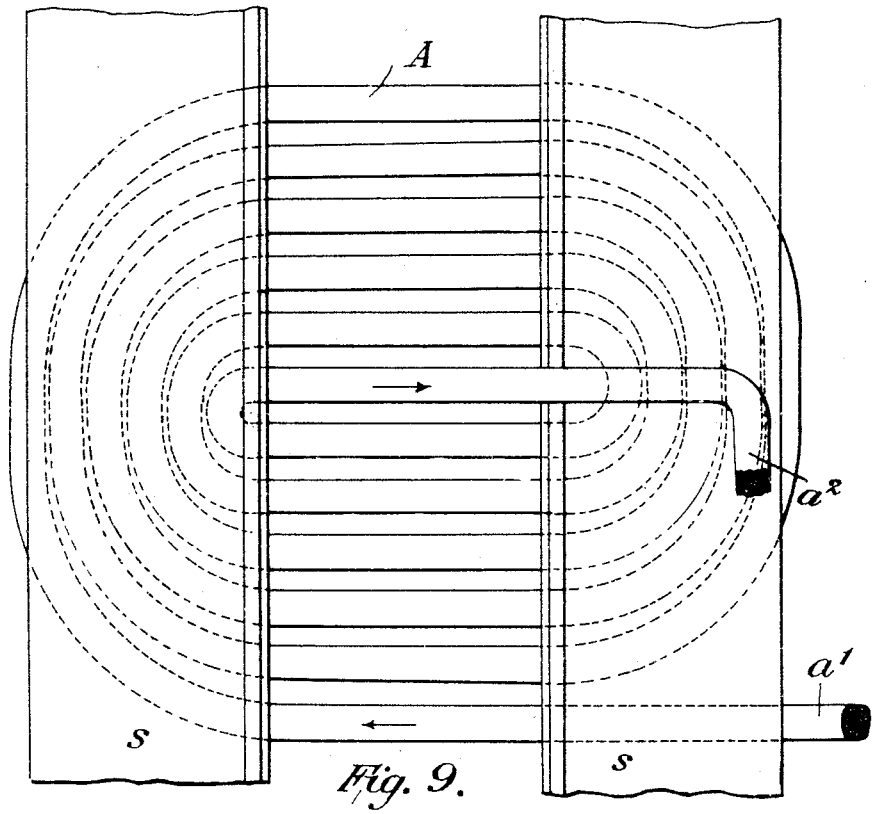

Referring to the accompanying drawings, Figure 1 is an end view of our dynamo-machine, the position of the winding being indicated in the slots 25 26–47 48. Fig. 2 is a side elevation, partly in section, on the line X X, Fig. 1, the winding being shown diagrammatically and the shunt-coils being removed. Fig. 3 is a diagrammatic view of the winding, the right-hand spiral being a plan of the lower half of the winding and the left-hand spiral an inverted plan of the upper half. Figs. 4 and 5 are developed views of part of the winding. Fig. 6 is a section of the conductors and insulation. Fig. 7 is an end elevation of our winding as applied to a four-pole dynamo. Fig. 8 is a section on the line Y Y, Fig. 7. Fig. 9 is a developed view showing part of the winding. Fig. 10 is a section on the line Z Z, Fig. 7, while Fig. 11 is a diagrammatic developed view of the winding.

Referring to Figs. 1 to 6, $a\ a$ are the field-magnets wound with divided shunt-coils $b\ b'$. The pole-pieces $c\ c'$ are divided along the line $x\ x$, Fig. 1. The fixed series winding for the purpose of our invention is placed around the space $d$, in which the armature revolves. The winding shown in Figs. 1 to 6 consists of two coils in series with the armature, the form of the winding being that of spirals on a cylindrical surface closely surrounding the armature, but giving clearance for its revolution. The coils $e\ f$ where they occupy the polar faces are embedded therein in open slots 1 2 3 4, &c., and between the polar faces are carried by non-magnetic segments $i$, suitably grooved for their reception. Beyond the magnets at each side the conductors pass in a direction perpendicular to the axis of the armature and are carried by cylindrical extensions $j\ j$. The coils are shown diagrammatically in Fig. 3. The first coil $e$ lies nearer to the armature in the slots, while the second coil $f$ lies parallel with the coil $e$ in the slots, but takes a different path between them, as shown in the developed views, Figs. 4 and 5, the true developed view from the inside being obtained by superposing Fig. 4 on Fig. 5. The first coil $e$ passes from front to back through the slot 47, from back to front through 48, and from 48 through 45 46, &c., to 26, from back to front through 26, and from the front of 26, by the connection $l$, to the back of 24, (see the left-hand bottom corner of the diagram, Fig. 3, in which the left-hand spiral is an inverted plan of the upper half of the winding,) and then through 24 23, &c., around the upper half of the armature to 2 1. The second coil $f$ joins the first at the back of slot 1, passes through 2 from back to front, and from 2 through 1 4 3 6 5, &c., to 23, through 23 from front to back, from the back of 23 to the front of 25 by the connection $m$, through 25 from front to back, and from 25 through 26 27 28, &c., to 48, which is the end of the second coil. The coils $e$ and $f$ are shown in full and dotted lines, respectively in the diagram, Fig. 3. The current in the part of each coil in any slot in or between the pole-faces will be opposite in direction to the current in the adjacent conductors in the armature. The winding may consist of one or more coils, (shown in Figs. 1 to 6,) and any other well-known winding, such as a drum-winding, giving the same result electrically may be used instead of the one described.

Fig. 6 shows a section of the conductors which lie in the slots, as indicated, in the lower half of Fig. 1. Each conductor consists of four rectangular copper bands placed together and covered with insulating material, the conductors $e\ f$ being wound separately in the slots and the whole covered with insulating material. The coils $e f$ are divided along a horizontal diameter $x\ x$, Fig. 1. The upper half 1 2–23 24 fits in the half pole-pieces $c\ c'$ and is also supported by the brass connecting-piece $k$ and extensions $j$. When it is desired to remove the armature, the field-magnet $a$ with the shunt-coils $b\ b'$ are slid outward in a horizontal direction, the line of separation being marked by the dotted lines $y\ y$, $y'\ y'$, $y''\ y''$ in Fig. 1. The binding-screws $l\ m$, connecting the upper and lower parts of the coils $e\ f$, are then loosened and the upper half of the coils, with the piece $k$ and extensions $j$, can be lifted out by the eye-bolt $n$. The polar plane of the coils $e f$ preferably coincides with the plane of commutation of the armature at no load, though in some cases we prefer to place it at an angle thereto, as subsequently explained.

Figs. 7 to 11 represent the arrangement suitable for a four-pole dynamo. The position of the winding with respect to the pole-pieces $p'\ p^2\ p^3\ p^4$ is indicated in the diagram Fig. 11, and it will be seen that the winding, which closely surrounds the armature, consists of four spirals A B C D of a single conductor, the central line of each spiral being half-way between the adjacent pole-pieces, the conductor being made up of strips of copper placed side by side. The winding where it lies within the magnets is supported in grooves in the pole-pieces parallel to the axis of the armature and between the pole-pieces is supported by rings $q$, bolted to the pole-pieces by bolts $r$. Sleeves $s$, bolted or otherwise attached to the pole-pieces, surround the part of the winding which is outside the magnets.

The path of the current in the winding is shown in the diagram by arrows and enters the winding at $a'$, passing around the coil A to $a^2$, and so to $b'\ b^2\ c'\ c^2\ d'$ and out at $d^2$. The arrangement shown in Figs. 7 to 11 is applicable to dynamos having two, four, or more poles.

The ampere-turns in the fixed coil must generally exceed the ampere-turns on the armature by an amount depending on the leakage coefficient of the dynamo and the self-induction of the armature-conductors. The total excess over the armature generally amounts to from one and a half to three times and in some cases more. This excess we have found to suffice to annul sparking with fixed brushes at all loads, even when the brushes are composed of metal gauze or wire. The operation of this excess is twofold—first, to annul the distortion of the field, and, second, to provide a sufficient counter electromotive force between the coils of the armature when at the position for commutation so as to balance the self-induction of commutation when commutation takes place.

We have found that it is preferable to distribute the fixed series conductors uniformly around the armature, though this may be sometimes varied.

In most instances the conductors that occupy the polar faces are embedded therein, preferably in open slots; but in some cases the slots may be closed with iron or tunnels may be used; but in such cases the thickness of iron over the conductors must be kept small. In all cases sufficient iron must be left between the conductors, so as not to seriously impede the magnetic flux.

Having now described our invention, what we claim as new, and desire to secure by Letters Patent, is—

1. A continuous-current dynamo-machine, comprising in combination, field-magnets having pole-pieces separated by air-gaps or non-magnetic bridge-pieces, a main shunt field-winding, a series winding uniformly surrounding the armature having its axis in the line of commutation, the number of ampere-turns in said series winding exceeding the number of ampere-turns in the armature by at least one and one-half to three times, as and for the purpose described.

2. A continuous-current dynamo-machine in which armature reaction is annulled and sparkless commutation obtained at all loads with fixed brushes, comprising in combination field-magnets having pole-pieces separated by air-gaps or non-magnetic bridge-pieces, a main shunt field-winding, a series winding uniformly surrounding the armature and having its axis in the line of commutation, the number of ampere-turns in said series winding exceeding the number of ampere-turns in the armature by at least one and one-half to three times, as set forth.

3. In a continuous-current dynamo-machine, in combination, field-magnets, pole-pieces to said field-magnets, non-magnetic segments between the edges of said pole-pieces, slots parallel to the axis of the armature in said pole-pieces, a fixed series winding disposed in said slots and uniformly distributed about said armature, the axis of said series winding being in the line of commutation and the number of ampere-turns in said series winding exceeding the number of ampere-turns in said armature by at least one and one-half to three times, as and for the purpose described.

4. In a continuous-current dynamo-machine, in combination, field-magnets, a part of said field-magnets being removable, pole-pieces to said field-magnets divided along a horizontal diameter, a fixed series winding uniformly surrounding said armature with its axis in the line of commutation, said series winding being divided along the same plane as said pole-pieces and being wound with a number of ampere-turns exceeding the number of ampere-turns in said armature by at least one and one-half to three times, as set forth.

5. In a continuous-current dynamo-machine, in combination, field-magnets having a yoke in the form of a ring, horizontal projections from said ring on which the field-windings are wound, part of said yoke being capable of sliding outward in a horizontal direction, pole-pieces to said field-magnets divided along a horizontal diameter, an armature revolving between said pole-pieces, a fixed series winding uniformly surrounding said armature and divided along the same plane as said pole-pieces, said series winding having its axis in the line of commutation and having a number of ampere-turns exceeding the number of ampere-turns in said armature by at least one and one-half to three times, and means for lifting the upper halves of said pole-pieces and said series windings, as set forth.

6. In a continuous-current dynamo-machine, in combination, field-magnets, a part of said field-magnets being removable, pole-pieces of said field-magnets divided along a horizontal diameter, non-magnetic segments between the adjacent edges of said pole-pieces, an armature revolving between said pole-pieces, slots parallel to the axis of said armature in said pole-pieces, and a fixed series winding disposed in said slots and divided along the same plane as said pole-pieces, said series winding having its axis in the line of commutation and having a number of ampere-turns exceeding the number of ampere-turns in said armature by at least one and one-half to three times, as set forth.

In witness whereof we have hereunto set our hands in presence of two witnesses.

CHARLES ALGERNON PARSONS.
GEORGE GERALD STONEY.

Witnesses to the signature of Charles Algernon Parsons:
    ALBERT E. PARKER,
    PERCIVAL M. DAVIES.

Witnesses to the signature of George Gerald Stoney:
    HENRY GRAHAM DAKYM, Jr.,
    FREDERICK GORDON HAY BEDFORD.